United States Patent [19]
Chou

[11] Patent Number: 5,209,604
[45] Date of Patent: May 11, 1993

[54] SOIL DECONTAMINATION

[75] Inventor: Charles C. Chou, Houston, Tex.

[73] Assignee: Shell Oil Company, Houston, Tex.

[21] Appl. No.: 682,172

[22] Filed: Apr. 9, 1991

[51] Int. Cl.[5] .......................... E02D 3/00; B09B 3/00
[52] U.S. Cl. .................................... 405/128; 405/131
[58] Field of Search ............... 405/128, 129, 131, 258, 405/263

[56] References Cited

U.S. PATENT DOCUMENTS

| | | |
|---|---|---|
| 4,376,598 | 3/1983 | Brouns . |
| 4,670,634 | 6/1987 | Bridges et al. . |
| 4,839,061 | 6/1989 | Manchak et al. ............... 405/128 X |
| 4,842,448 | 6/1989 | Koerner et al. ..................... 405/258 |
| 4,984,594 | 1/1991 | Vinegar et al. . |
| 5,004,373 | 4/1991 | Carter ................................. 405/131 |
| 5,024,556 | 6/1991 | Timmerman ........................ 405/128 |

Primary Examiner—David H. Corbin

[57] ABSTRACT

The top layers of soil contaminated with halogenated organic chemicals are remediated by initial heating at moderate temperature and reduced pressure to remove soil moisture and volatile contaminants and subsequently heating the soil of minimum clay content or acidity at higher temperature, thereby decomposing the halogenated organic chemicals contained therein. Means for effecting such remediation is provided which includes a heat source, pressure regulating means, and vapor collection and treatment means.

13 Claims, 2 Drawing Sheets

SOIL DECONTAMINATION

FIELD OF THE INVENTION

This invention relates to an in-situ process for the remediation of soil containing organic contaminants including halogenated organic chemicals. More particularly, the invention provides for decontamination of soil containing haloorganic pesticides, including a method for the thermal degradation of soil-adsorbed pesticides.

BACKGROUND OF THE INVENTION

A variety of methods have been proposed for the remediation of soils containing organic contaminants. Many of the proposed methods involve evacuation and subsequent incineration of the soil with attendant difficulties of treatment or disposal of the off-gases. The total cost of such processes is high, often exceeding 500 U.S. dollars per ton of soil.

To avoid at least a portion of these problems, several types of in-situ processes have been proposed including vitrification of the soil by electrode heating, steam or hot air heating of the soil through an auger system or through stationary pipes, radio-frequency heating and electrical heating by means of a surface heater.

Brouns et al, U.S. Pat. No. 4,376,598, disclose a vitrification process in which the soil is heated to approximately 1500° C. At or about this temperature the soil forms a glass-like mass which traps the contaminants within. This process, in reality, is a stabilization process rather than a decontamination process since the soil undergoing treatment has lost its physical and chemical identity. Both an auger system for injecting steam or hot air and a process of steam injection from stationary pipes have been practiced commercially. These methods are best applied to small areas of soil containing deep contamination such as localized spills at service stations. The methods are not as useful when applied to large areas of soil or to soil containing relatively shallow contamination. Bridges et al, U.S. Pat. No. 4,670,634, disclose an in-situ thermal process for soil decontamination where the thermal energy is supplied by radio-frequency heating. The process is particularly applicable to water-containing soils where the steam generated in the soil serves to strip organic contaminants from the soil. A somewhat related process is shown by copending U.S. patent application Ser. No. 427,418, filed Oct. 27, 1989, now U.S. Pat. No. 4,984,594, wherein the thermal energy is supplied by means of a relatively flat heater deployed at the surface of the soil.

Each of these in-situ methods is hampered by requirements for lengthy periods of heating and often multiple treatments are required. The methods that depend upon the presence of moisture in the soil are relatively inefficient in arid or semi-arid areas without the addition of large volumes of water. Moreover, each of the methods require continuous use of vapor collection systems to collect the contaminants desorbed from the soil and some means to treat or dispose of the material collected.

In the Bridges et al patent, general process mechanisms are discussed such as pyrolysis, oxidation and chemical reaction by which the chemical nature of soil contaminants is altered. However, the teachings are general in nature and no disclosure is made of specific methods for effecting low temperature degradation of soil contaminants. It would be of advantage to provide a simplified, relatively low temperature in situ process for soil decontamination with attendant simplified off-gas control.

SUMMARY OF THE INVENTION

The present invention provides an improved in-situ method for remediation of soils contaminated by organic chemicals. More particularly, the invention provides a method for decontamination of soil by decomposition of haloorganic chemicals contained therein. The process is conducted by aerily enclosing a section of surface soil contaminated with organic chemicals such as halogen-containing pesticides, removing any soil moisture and volatile contaminants at moderately elevated temperature and reduced pressure, and heating the soil of controlled clay content or acidity to a temperature above that of the initial removal but maintained below the boiling point of the organic contaminants.

DESCRIPTION OF THE INVENTION

The present invention is an improved in-situ process for removal of certain organic contaminants from soil, especially haloorganic contaminants. It is particularly useful as an in-situ method of remediating soils contaminated with biorefractory pesticides or other halogenated organic chemicals which are normally retained in the top or surface layers, e.g., the top 1-2 feet or so, of soil because of the strong adsorption of such materials to the soils.

In accordance with the present invention, the top layers of a contaminated soil are aerily enclosed and initially maintained at a moderate and somewhat elevated temperature under reduced pressure to allow any soil moisture and volatile contaminants such as hydrocarbons, arsenic and mercury compounds to leave the soil for collection and any necessary further treatment. In this initial removal step, the soil is typically heated to a moderate temperature at or near about 100° C. Temperatures from about 70° C. to about 110° C. are useful and even ambient soil temperature may be used in areas of high ground temperature. At such temperatures, only short heating periods are required when reduced pressures on the order of 10–70 cm/Hg are employed. The soil moisture and any soil contaminants with relatively low boiling points are removed from the soil and any non-aqueous vapors are treated as by passage through a solvent scrubber or an adsorbent or as by catalytic oxidation of such vapors.

The resulting substantially dry soil is then heated at or about ambient pressure in the presence of clay or an acidic material to decompose the halogenated organic contaminants remaining in the soil. In this heating phase, the soil is heated to a temperature from about 150° C. to about 300° C. The resulting contaminant decomposition is less dependent on the presence or absence of oxygen but is more dependent upon the clay content and/or acidity of the soil. Chlorinated pesticides that would not appreciably decompose at such temperatures in a soil consisting primarily of sand will efficiently decompose when the soil is modified by the addition of clay or acidified by the addition of acid. The halogenated organic chemicals will decompose under these conditions to yield primarily carbon dioxide, water and hydrogen halide, e.g., hydrogen chloride or hydrogen bromide. The treatment of these off-gases is considerably easier than when non-decomposed soil contaminants are removed. When the contamination level is not too high, for example less than about 0.1% by weight, the acidic gases are retained by the soil or are neutralized by carbonates or other soil components, and the off-gas treatment is even more simplified.

To obtain the requisite soil heating, a number of in-situ heating means devices can be employed. With a typical heating device, means are provided for aerily enclosing the soil to be treated and generate heat from a source such as electricity, natural gas, liquid fuel or a radio-frequency transmitter. Heat transfer means are also provided to facilitate transfer of heat from the heating device to the soil through vertical and/or horizontal contact with the soil. In operation, the heating device is used in conjunction with means for subjecting the enclosed soil to regulated pressure and collecting and/or treating any vapors released from the soil.

In a preferred embodiment, a detachable module is utilized to enclose the soil and provide heat, reduced pressure and vapor treatment. Such modules are operated from a mobile power source and a plurality of such modules are suitably operated simultaneously or in sequence to decontaminate large areas. The heating time, temperature and other parameters are therefore locally optimizable to provide for efficient but maximum soil decontamination. The size and geometry of such modules will be selected for best local adaption.

DETAILED DESCRIPTION OF PREFERRED EMBODIMENTS

Figure 1:
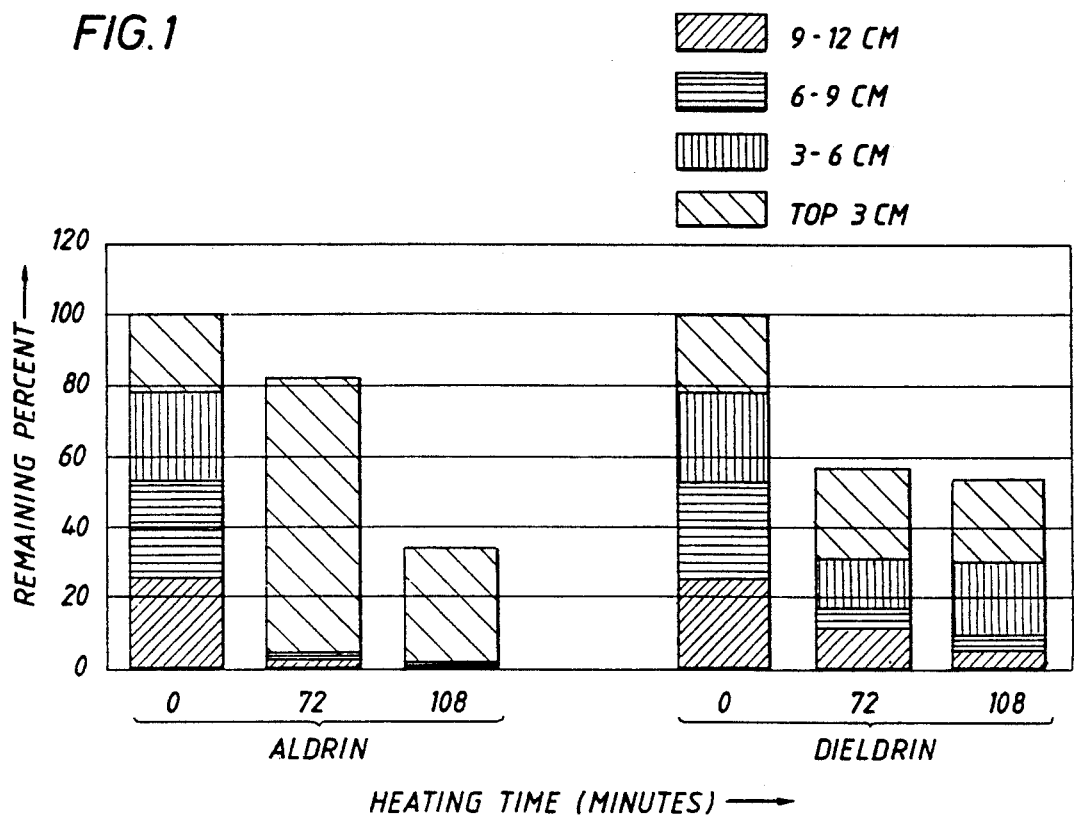
FIG. 1 depicts in graphic form the decomposition of several chloroorganic pesticides from soil upon application of heat.

The process of the invention is particularly applicable to the in-situ decontamination of soils contaminated by chlorinated organic pesticides with optional quantities of organic solvents, arsenic or mercury compounds present. Specific application of the process is to soils contaminated with pesticides such as DDT®, LINDANE®, CHLORDANE®, HEPTACHLOR®, TOXAPHENE® and DIBROMOCHLOROPROPANE®, and the process is particularly applied to soils containing the class of chlorinated pesticides often referred to as chlorocyclodienes, e.g., DIELDRIN®, ALDRIN®, ENDRIN®, and ISODRIN®. This process is also applicable to the removal of polychlorinated biphenyls (PCB) and dioxins. Such contaminants are typically retained in the top two feet of soil and frequently in the top one foot of soil by adsorption of the contaminant on the soil particles. Such nonvolatile organic pesticides will decompose if heated to a sufficiently high temperature, e.g., 500°-600° C., but are decomposed in the second heating phase as described above at substantially lower temperatures when clay is present or when the soil is relatively acidic. At a temperature of 250° C., for example, DIELDRIN® is stable on sand when heated in air but decomposes rapidly when adsorbed on clay. Without wishing to be bound by any particular theory, it appears probable that the presence of clay or relatively acidic soil serves to catalyze the decomposition of the chlorinated pesticides which then decompose relatively rapidly at significantly lower temperatures.

To effectively obtain pesticide decomposition according to the invention, the contaminated soil to be treated should contain a significant proportion of clay or be relatively acidic. Some soils contain appreciable quantities of clay and for such soils the addition of clay or acid is not required. For soils containing as much as 10% by weight of clay the addition of clay or acid is optional and not required. However, even for soils containing as much as 5% by weight of clay the addition of clay or acid is desirable. When clay is provided, the preferred clays to be added are bentonite, aluminum kaolinite, acid kaolinite, gibbsite and geothite. Such clays are provided to the soil with appropriate means to mix the provided clay with the top layers of the soil so that the clay content of the top layer is at least about 5% by weight, preferably at least about 10% by weight. Typical mixing means include plowing and disking and other conventional methods, or spraying a clay slurry on top of contaminated soils.

By analogy, some soils are sufficiently acidic so that pretreatment with an acidic material is not required as the alternative to clay addition. To obtain the advantages of the process of the invention the soil pH is adjusted as necessary as an alternative to clay addition. The soil should be relatively acidic but not necessarily be acidic. For efficient operation of this embodiment of the present process, the soil should have a pH from about 5.5 to about 7.4 although soils having a lower pH are also satisfactory. Best results of decontamination of a relatively acidic soil are obtained if the soil pH is from about 5 to about 7. It should be recognized that only the top two feet or so of the soil to be treated needs to be relatively acidic. For an overly basic soil, when acid is to be provided the above-discussed mixing methods are suitable as is injection of an acid in a liquid form. Suitable soil acidifiers are ferric and ferrous salts, aluminum salts, gypsum, dilute nitric, sulfuric, carbonic or phosphoric acid or mixtures thereof.

The clay or acid, if required, is suitably provided to the soil at any time prior to the heating phase wherein pesticides are decomposed. It is preferred, however, to add any necessary clay or acid before the initial placement of the module in contact with the soil. Any moisture in the clay or acid is then removed during the initial phase at reduced pressure and the phases of the decontamination process can be conducted without interruption.

A preferred design for application of the process of the invention employs a mobile module system driven and carried by tractor-trailer transportation means, typically equipped with hydraulic means to enclose a portion of the soil by pressing on or into the soil a heating, pressure regulating and gas receiving and treating module. When the module is in place and the decontamination process is initiated, the tractor and hydraulic means are able to be used elsewhere to place additional modules. Each module includes a heat source which cooperates with heat transfer means such as flat vertical or horizontal plates or spikes to transfer heat into the soil by conduction from the heat transfer means or by passage of hot gases through the heat transfer means and into the soil. For best top soil heating, the heat transfer means includes a plurality of plates or spikes to be inserted into the soil and a suitable length for such plates or spikes is about one foot. The periphery of the module confines the soil to be treated by compaction as by pressing on the soil or by cutting into the soil. Such confinement means facilitates removal of vapors generated from the soil undergoing treatment through openings in the top of the module. The module also includes means for regulating the pressure under the module and at or under the surface of the soil in contact therewith. Whenever the module is being pushed against or into the soil, a positive pressure is generated through the holes at the top of the module in order to keep such holes free of soil. However, during the initial heating phase of the decontamination process, the pressure below the module is reduced so that vapors generated in the soil pass from the soil and through the openings in the top of the module. The pressure regulating means is suitably a pump installed on the module which further includes vapor collection means mounted between the pressure regulating means and the soil and includes openings on the top of the module connected to the vapor collection means and to the pressure regulating means by a duct or series of ducts which are preferably flexible. A vapor treatment means serves to receive vapor from the pressure regulating means and if necessary degrade the environmentally undesirable portion of the vapors originating in the soil. This vapor treatment means is suitably a catalytic column of material such as clay, aluminum oxide, copper oxide, or iron oxide operating at a temperature from about 200° C. to about 400° C. or alternatively is a liquid scrubber or activated carbon adsorbant operating at a temperature of about 100° C. If necessary, cooling means are provided to reduce the temperature of the vapors or off-gases from the soil before reaching the vapor collecting means. In an alternate modification, undesirable vapors from the soil are treated by passage through a vapor degradation zone which suitably comprises a layer of clay placed on top of the soil through which vapor and off-gas must pass during removal from the soil under reduced pressure.

Suitable heat sources include electricity, natural gas and liquid fuels. When electricity is used as the heat source, in one modification, electric heating elements may be built directly into the heat transfer means which contact or penetrate the soil. Alternatively, electricity is used to provide microwave energy which serves to heat the soil. In this embodiment a microwave generator is built into the module which also contains a wave guide. In another embodiment, natural gas or liquid fuels are suitably combusted in a burner constructed within the module and the hot gases thereby produced are passed through the heat transfer means and onto or into the soil. In yet another embodiment electricity or combustion is used to raise the temperature of a heating fluid in a heat exchanger and the fluid circulates through the heat transfer means to transfer heat to the soil. The heat transfer means will usefully be constructed of some material such as a metal with high heat conductivity as well as a resistance to corrosion by the acid gases produced during soil decontamination.

During operation of one heating phase, the heat source is often operated to raise the temperature of the soil to a somewhat elevated, moderate temperature while the pressure regulating means is used to reduce the pressure adjacent to the surface of the soil in order to facilitate removal from the soil of soil moisture and volatile contaminants. The soil moisture is preferably reduced to no more than 0.5% by weight. When the major portion of any moisture and volatile contaminants have been removed, the pressure regulating means is typically deactivated while the heat source is used to raise the soil temperature to a temperature sufficient to cause decomposition of the chlorinated pesticides in the presence of the clay-containing or relatively acidic soil. The heat source is operated during these phases in accordance with the temperature desired, the moisture content of the soil, the thermal gradient between the heat source and the soil and the thermal conductivity of the soil. When the device of the invention is used, top soil having a moisture content of about 5% by weight can be dried and heated to a temperature of about 150°–200° C. in several hours. To effect substantial decontamination of the upper layers of soil containing chlorinated organic pesticides, heating for an additional period of about several hours to a day is typical. For example, in several laboratory tests and a field demonstration, soils containing 10 mg to 100 mg DIELDRIN ® and ALDRIN ® and 10% to 30% clay were heated to 200° C. to 250° C. Approximately 99.9% of these two pesticides in the top 12 inches of soil was destroyed after 10–20 hours.

DETAILED DESCRIPTION OF THE DRAWINGS

FIG. 1 is a graph depicting the removal of ALDRIN ® and DIELDRIN ®, two representative chloroorganic pesticides, in soil upon application of heat. To represent field conditions, a 183 g sample of soil contaminated with the pesticide being treated was placed in a stainless steel tube having a height of 13 cm and a diameter of 3.7 cm. During a 72 minutes period of heating, the minimum temperature in the top portion of the sample was 132° C., the minimum temperature in the central portion of the soil was 101° C. and the minimum temperature in the bottom portion was 116° C. During a 108 minute heating period for a second sample, the minimum temperatures in the top, central and bottom portions of the soil were 120° C., 103° C. and 114° C., respectively.

Figure 2:
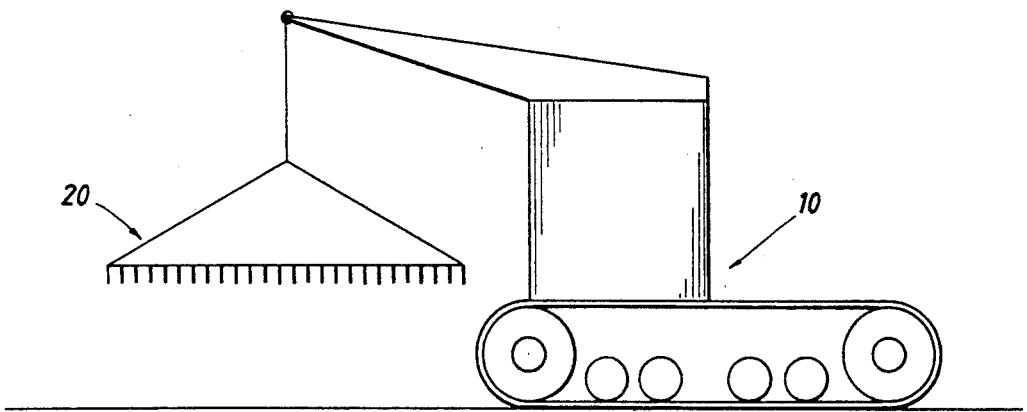
FIG. 2 depicts transportation means 10 for moving and locating a detachable module 20.

FIG. 2 represents one embodiment of the invention where a crane mounted on a tractor serves as transportation means 10 to position a module 20. The module is detachable so that the transportation means can position and/or move a number of the modules 20.

Figure 3:
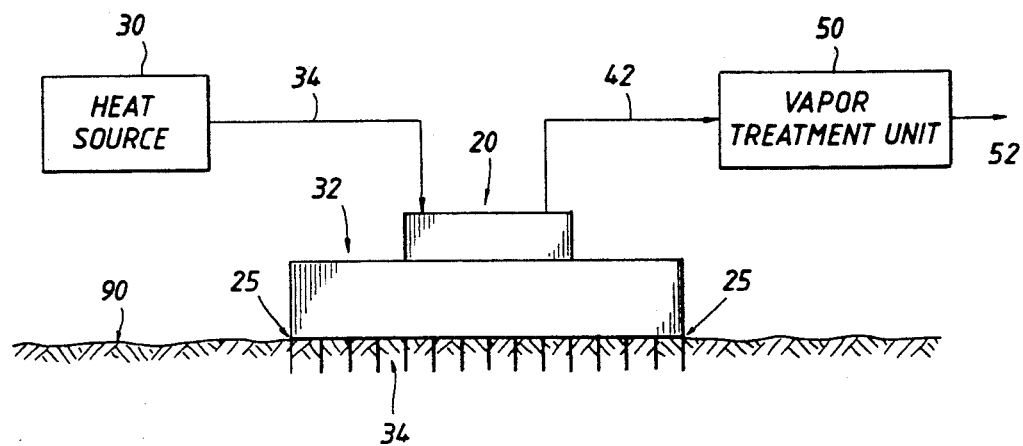
FIG. 3 depicts the module 20 in contact with the contaminated soil 90, the module 20 including a heat source 30, heat transfer means 34, and a vapor removal line 42 leading to vapor treatment means 50 from which treated gases exit by line 52.

FIG. 3 depicts a modification of the invention wherein the module 20 has been inserted into the surface of soil 90 to confine the soil at the module periphery 25. A heat source 30 supplies heat to a heating press 32 and then to spikes 34 serving as heat transfer means. Vapor from the soil is drawn through a vapor removal line 42 by pressure regulating means (not shown) and passed to vapor treatment means 50. The treated and environmentally acceptable vapors leave the vapor treatment means 50 by line 52.

Figure 4:
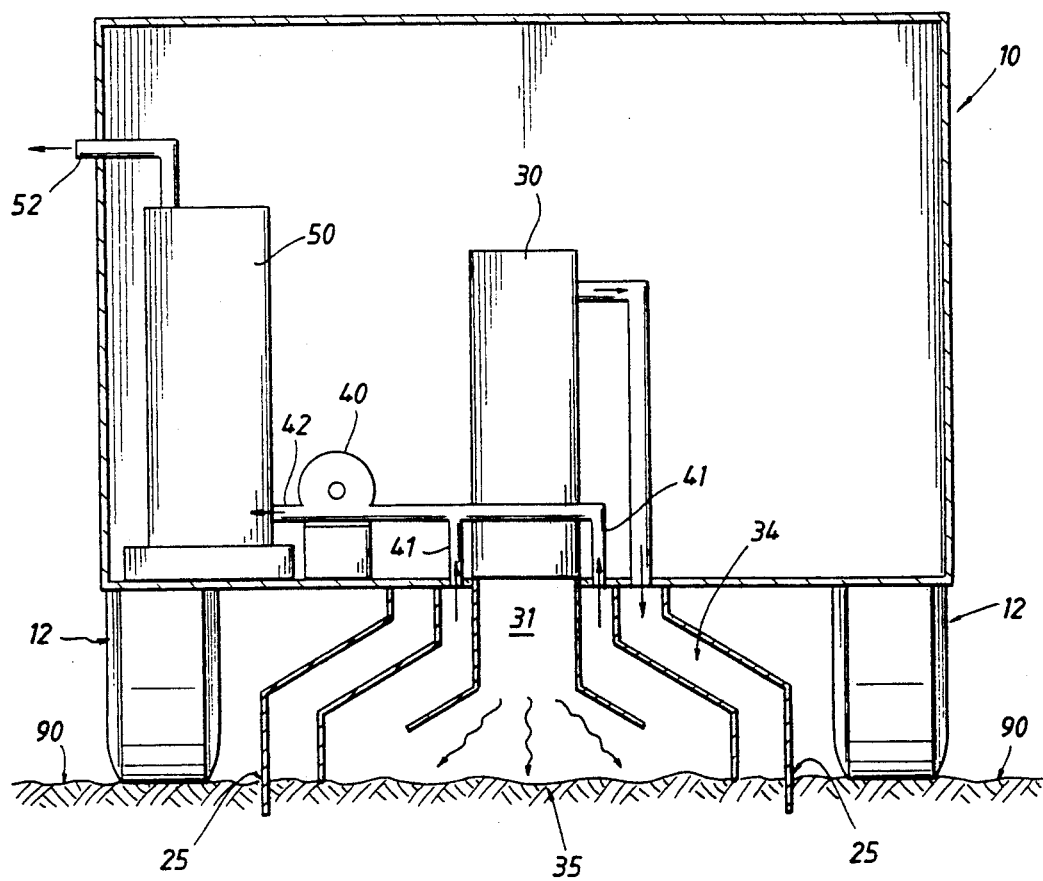
FIG. 4 depicts a preferred modification where a microwave generator heat source 30, a vacuum pump pressure regulating means 40 and a vapor treatment unit 50 are mounted on a trailer as transportation means 10.

FIG. 4 depicts in greater detail a preferred embodiment of the invention wherein the module necessary to remediate contaminated soil is mounted on trailer transportation means 10 movable on wheels 12. When the module is placed on the surface of the soil 90 it confines the soil at its periphery 25. A heat source comprising a microwave generator 30 equipped with a wave guide 31 serves to heat air which is passed into the soil through heat exchange means 34 at least partially inserted into soil 90. The microwave generator also supplies heat energy to the soil by direct projection of radio-frequency energy onto the surface of the soil at 35. When desired, vapors generated within the soil are removed under the influence of a vacuum pump pressure regulating means 40, passing through vapor collection means 41 and line 42 into vapor treatment means 50 comprising an adsorbent or a scrubber to remove environmentally undesirable components of the vapor. Treated and thus environmentally acceptable vapor leaves the vapor treatment means 50 by line 52.

Various modifications of the present invention will be apparent from the foregoing description. Such modifications are intended to fall within the scope of the appended claims.

What is claimed is:

1. A method for remediating soil contaminated by the presence therein of organic contaminants which comprises the steps of:
    placing a portable heating and pressure-reducing module in sealing contact with said contaminated soil, said soil having a moisture content of no more than 0.5% by weight and a clay content of at least 5% by weight;
    enclosing said contaminated soil with said portable heating and pressure-reducing module; and
    heating said contaminated soil to a temperature of from 150° C. to 300° C.

2. The process of claim 1 wherein said heating is accomplished through heating elements, rigidly located on said module, which are inserted into said contaminated soil.

3. The process of claim 2 wherein said heating is accomplished by applying electrical power to said heating elements.

4. A method for remediating soil contaminated by the presence in the top layers thereof of halogenated organic pesticidal compounds which comprises the steps of:
    sealingly enclosing said contaminated soil with a portable heating and pressure-reducing means;
    reducing pressure over said enclosed, contaminated soil;
    heating said contaminated soil to a temperature of from 70° C. to 110° C.;
    maintaining said soil at a temperature of from 70° C. to 100° C. and at reduced pressure to remove moisture and volatile contaminants from the soil; and
    subsequently heating said soil, said soil having a clay content of at least 5% by weight or a pH below 7.4 and a moisture content below 0.5% by weight, to a temperature of from 150° C. to 300° C. to decompose the halogenated organic pesticides.

5. The process of claim 4 wherein said heating is accomplished through heating elements, rigidly located on said module, which are inserted into said contaminated soil.

6. The process of claim 5 wherein said heating is accomplished by applying electrical power to said heating elements.

7. The process of claim 4 wherein said clay content is obtained by adding to said contaminated soil, prior to heating, sufficient clay to provide soil having a clay content of at least 5% by weight and wherein sufficient acid is added to provide soil having a pH below 7.4.

8. The process of claim 5 wherein said clay content is obtained by adding to said contaminated soil, prior to heating, sufficient clay to provide soil having a clay content of at least 5% by weight and wherein sufficient acid is added to provide soil having a pH below 7.4.

9. The process of claim 6 wherein said clay content is obtained by adding to said contaminated soil, prior to heating, sufficient clay to provide soil having a clay content of at least 5% by weight and wherein sufficient acid is added to provide soil having a pH below 7.4.

10. An apparatus for remediating the top layers of soil contaminated with halogenated organic chemicals comprising:
    a portable module, including soil confinement means rigidly located thereon, for sealingly enclosing said contaminated soil when said module is placed in contact with the surface of said contaminated soil;
    heat transfer means rigidly located on said module for penetrating said contaminated soil;
    heating means cooperating with said heat transfer means for transferring heat from said heating means to said contaminated soil;
    pressure reducing and regulating means connected to said module to control pressure at or below the surface of said contaminated soil;
    vapor collection means connected to said module to remove vapor from or above said contaminated soil; and
    vapor treatment means connected to said vapor collection means to remove the environmentally undesirable portion of said vapors.

11. The apparatus of claim 10 wherein said heating means is electrical power.

12. The apparatus of claim 10 wherein said heating means is hot gases.

13. An apparatus for remediating the top layers of soil contaminated with halogenated organic chemicals comprising:
    a portable module, including soil confinement means rigidly located thereon, for sealingly enclosing said contaminated soil when said module is placed in contact with the surface of said contaminated soil;
    heating means rigidly located on said module for transferring heat to said contaminated soil;
    pressure reducing and regulating means connected to said module to control pressure at or below the surface of said contaminated soil;
    vapor collection means connected to said module to remove vapor from or above said contaminated soil; and
    vapor treatment means connected to said vapor collection means to remove the environmentally undesirable portion of said vapors.

* * * * *